(12) United States Patent
Lee et al.

(10) Patent No.: US 10,160,484 B2
(45) Date of Patent: Dec. 25, 2018

(54) ENHANCED STEERING WHEEL HOLD DETECTION BY A HYBRID METHOD

(71) Applicant: GM GLOBAL TECHNOLOGY OPERATIONS LLC, Detroit, MI (US)

(72) Inventors: Jin-Woo Lee, Rochester Hills, MI (US); Bakhtiar B. Litkouhi, Washington, MI (US); Stephen R. Pastor, Farmington Hills, MI (US); Kenneth L. Oblizajek, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 194 days.

(21) Appl. No.: 15/216,916

(22) Filed: Jul. 22, 2016

(65) Prior Publication Data

US 2017/0029021 A1 Feb. 2, 2017

Related U.S. Application Data

(60) Provisional application No. 62/199,703, filed on Jul. 31, 2015.

(51) Int. Cl.
*B62D 6/00* (2006.01)
*B62D 5/04* (2006.01)
(Continued)

(52) U.S. Cl.
CPC ............. *B62D 6/00* (2013.01); *B62D 5/0457* (2013.01); *B62D 15/025* (2013.01); *G05D 1/0061* (2013.01); *G05D 1/0088* (2013.01)

(58) Field of Classification Search
CPC ........ B62D 15/025; B62D 6/00; B62D 15/00; B62D 5/0481; B62D 1/286; B62D 5/0457
See application file for complete search history.

(56) References Cited

U.S. PATENT DOCUMENTS

| | | | |
|---|---|---|---|
| 6,219,603 B1 * | 4/2001 | Yamamoto | B62D 5/008 180/444 |
| 6,744,232 B2 * | 6/2004 | Endo | B62D 5/046 318/432 |

(Continued)

FOREIGN PATENT DOCUMENTS

DE  10 2005 056 438 A1  6/2007

*Primary Examiner* — Redhwan K Mawari
(74) *Attorney, Agent, or Firm* — Quinn IP Law (57) ABSTRACT

A system and method for determining whether a driver is holding a vehicle steering wheel. The vehicle will include an electric power steering system and may further include autonomous or semi-autonomous driving features, such as Lane Centering Control or Lane Keeping Assist. The system includes a passive detection technique which monitors steering torque and steering angle, determines a resonant frequency of oscillation of the steering system from the measured data, and compares the resonant frequency to a known steering system natural frequency to make a hands-on/off determination. If the passive technique results are below a confidence threshold, then an active technique is employed which provides a steering angle perturbation and measures the frequency response, where the perturbation signal has characteristics which are prescribed based on the results of the passive technique. A steering torque greater than a threshold value is also an indication of the driver holding the steering wheel.

20 Claims, 4 Drawing Sheets

(51) Int. Cl.
*B62D 15/02* (2006.01)
*G05D 1/00* (2006.01)

(56) References Cited

U.S. PATENT DOCUMENTS

| | | | | |
|---|---|---|---|---|
| 7,912,665 | B2 * | 3/2011 | Deng | B60K 28/06 |
| | | | | 180/400 |
| 8,880,287 | B2 | 11/2014 | Lee et al. | |
| 9,096,262 | B2 | 8/2015 | Urhahne | |
| 2003/0144801 | A1 | 7/2003 | Braeuchle et al. | |
| 2008/0249685 | A1 * | 10/2008 | Hara | B62D 5/006 |
| | | | | 701/42 |
| 2009/0294206 | A1 | 12/2009 | Oblizajek et al. | |
| 2010/0108432 | A1 * | 5/2010 | Okazaki | B62D 5/0463 |
| | | | | 180/446 |
| 2010/0152952 | A1 * | 6/2010 | Lee | B62D 1/286 |
| | | | | 701/31.4 |
| 2010/0228417 | A1 * | 9/2010 | Lee | B62D 15/025 |
| | | | | 701/23 |
| 2013/0158771 | A1 * | 6/2013 | Kaufmann | B60W 40/08 |
| | | | | 701/23 |
| 2013/0317699 | A1 * | 11/2013 | Urhahne | B62D 15/025 |
| | | | | 701/41 |
| 2014/0257628 | A1 * | 9/2014 | Lee | B62D 5/0481 |
| | | | | 701/34.4 |
| 2017/0029021 | A1 * | 2/2017 | Lee | B62D 5/0457 |

\* cited by examiner

ENHANCED STEERING WHEEL HOLD DETECTION BY A HYBRID METHOD

BACKGROUND OF THE INVENTION

Field of the Invention

This invention relates generally to a system and method for detecting whether a driver is holding a steering wheel of a vehicle and, more particularly, to a system and method for determining whether the vehicle driver is holding the steering wheel of the vehicle when the vehicle is in an autonomous, semi-autonomous or manual driving mode, including using both passive and active hands-on/off detection techniques, where both techniques measure steering torque and steering angle and analyze frequency response of steering oscillation to determine whether the driver is holding the steering wheel.

Description of the Related Art

The automobile industry has been making continuous efforts to enhance the comfort and safety of the occupants of a vehicle, especially the driver. These endeavors have resulted in various technologies, such as advanced driver assistance systems (ADAS) and electronic stability control (ESC) systems. Some of the types of ADAS are adaptive cruise control systems, lane keeping assist (LKA) systems and lane centering control (LCC) steering systems. ESC systems, on the other hand, use computerized technologies that improve vehicle handling by detecting and preventing unstable conditions.

Another type of ADAS is an active front steering (AFS) system that adds or subtracts a steering component to the angular movement of the steering wheel in order to reduce the driver effort required to rotate the steering wheel and/or augment the driver steering for improved vehicle safety and stability. The resulting steering angle or torque thus includes the steering input by the driver and the component contributed by the active steering system.

Adaptive cruise control systems have been developed where not only does the system maintain the set speed, but it also will automatically slow the vehicle down in the event that a slower-moving preceding vehicle is detected using various sensors, such as radar and cameras. Certain modern vehicles also provide semi-autonomous parking, where the vehicle will automatically provide the steering control for parking the vehicle. Another type of advanced capability is provided by vehicle stability control systems, which intervene in conditions that may affect vehicle stability—such as if the driver makes harsh steering changes or enters a curve at too high of a speed. Further, fully autonomous vehicles have been demonstrated that can drive in simulated urban or highway traffic, observing all of the rules of the road.

The systems described above aid the driver by reducing the driving burden. However, it is typically not desirable to reduce the driver's vigilance and attentiveness, even when such systems are providing some or most of the control of the vehicle. It is generally required that the driver keeps his/her hands on the steering wheel, and is ready to take over the steering control whenever the situation demands. Quick and reliable determination of whether the driver's hands are on the steering wheel is needed, whether in a manual steering mode or a system-assisted steering mode.

SUMMARY OF THE INVENTION

In accordance with the teachings of the present invention, a system and method are disclosed for determining whether a vehicle driver is holding a steering wheel of the vehicle. The vehicle will include an electric power steering (EPS) system and may include an active front steering (AFS) system. The vehicle may further include autonomous or semi-autonomous driving features, such as Lane Centering Control (LCC) or Lane Keeping Assist (LKA). The system includes a passive detection technique which monitors steering torque and steering angle signals, determines a resonant frequency of oscillation of the steering system from the measured data, and compares the resonant frequency to a known natural frequency of the steering system to make a hands-on/off determination. If the passive technique yields results which are below a certain confidence threshold, then an active technique is employed which provides a steering angle perturbation signal and measures the frequency response, where the perturbation signal has a frequency, amplitude and duration which are determined based on the results of the passive technique. A measured steering torque greater than a threshold value is also taken as an immediate indication of the driver holding the steering wheel.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for determining whether a vehicle driver is holding a steering wheel of the vehicle is merely exemplary in nature, and is in no way intended to limit the invention or its applications or uses. For example, the invention described below has particular application for determining whether a vehicle driver is holding a steering wheel of the vehicle when the vehicle includes a Lane Centering Control (LCC) or Lane Keeping Assist (LKA) feature. However, the invention is also applicable to purely manual driving situations in any type of vehicle, and may also have non-automotive applications.

Figure 1:
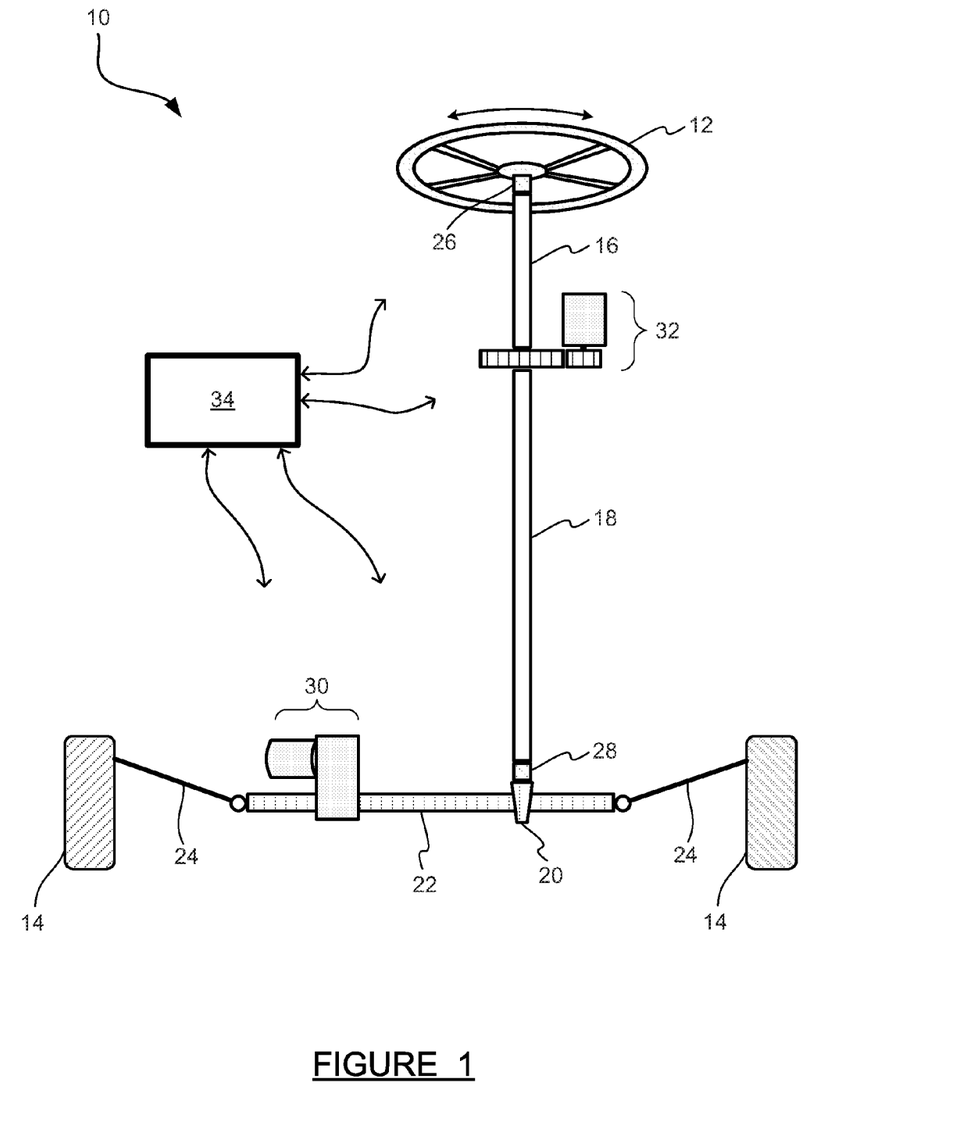
FIG. 1 is a plan view of a vehicle steering system, including sensors and a controller used for determining whether a driver is holding a vehicle steering wheel.

FIG. 1 is a plan view of a vehicle steering system 10 including a steering wheel 12 for steering front wheels 14 of a vehicle. The steering wheel 12 is coupled to the wheels 14 through a main shaft 16 and an intermediate shaft 18, a pinion 20, a steering rack 22, and tie rods 24. As would be understood by those skilled in the art, rotation of the steering wheel 12 causes corresponding rotation of the main shaft 16, the intermediate shaft 18 and the pinion 20. The rotation of the pinion 20 causes a translational movement of the rack 22, which in turn drives the inboard ends of the tie rods 24 laterally, causing a left or right steering motion of the front wheels 14. Other components, such as a universal joint coupling the main shaft 16 to the intermediate shaft 18—not essential to the understanding of the invention—are omitted for clarity. Other types of steering systems—not including the rack 22 and the pinion 20—also exist, and are equally applicable to the hands-on/off detection techniques discussed below.

A steering angle sensor 26 mounted to the main shaft 16 measures the rotation of the steering wheel 12 and the main shaft 16 and provides a steering angle signal indicative of same. A steering torque sensor 28 measures the torque on the intermediate shaft 18 near the pinion 20, and provides a torque signal indicative of same. The positions of the steering angle sensor 26 and the steering torque sensor 28 need not be exactly as shown in FIG. 1; the sensors could be located elsewhere as long as they provide the needed steering angle and steering torque signals.

The steering system 10 includes an electric power steering (EPS) system 30 coupled to the steering rack 22 that provides electric steering assist in response to the vehicle driver turning the steering wheel 12, in a manner that is well understood in the art. In other words, when the vehicle driver turns the steering wheel 12, the EPS system 30 provides an assisting force on the rack 22 so that the steering of the front wheels 14 on the roadway is easier. The vehicle system 10 may also include an active front steering (AFS) system 32 mounted to the intermediate shaft 18. AFS systems are well known to those skilled in the art to provide additional steering, or corrective steering, in various types of vehicle stability control or collision avoidance situations, where the AFS system 32 may steer the front wheels 14 independently of the driver's effort applied to the steering wheel 12.

The steering system 10 also includes a controller 34, in communication with the steering angle sensor 26, the torque sensor 28, the EPS system 30 and (optionally) the AFS system 32. The controller 34 is configured with an algorithm which determines if the driver is holding the steering wheel 12, using input from the sensors 26 and 28 and other known parameters of the steering system 10, according to the following discussion.

As will be discussed in detail below, the present invention provides a technique for determining whether the vehicle driver is holding onto the steering wheel 12. The technique can be applied whether an autonomous or semi-autonomous driving system—such as Lane Centering Control or Lane Keeping Assist—is active or not. A Lane Centering Control (LCC) system attempts to maintain the vehicle in the center of the lane, by making continuous steering adjustments based on the vehicle's position in the lane as determined by sensors. A Lane Keeping Assist (LKA) system attempts to keep the vehicle within the lane, by making a steering correction only if the vehicle is about to depart the lane.

LCC and LKA systems include algorithms which need to know if the driver is holding onto the steering wheel 12, both as a safety precaution, and in anticipation of a steering override by the driver. It is also desirable, for obvious reasons, to know if the driver's hands are not on the steering wheel 12 when the vehicle is not steering itself via LCC or LKA, or when LCC/LKA steering control is to be released. From this motivation, a technique for making sure that the vehicle driver is holding onto the steering wheel 12 is provided. The particular vehicle will include the EPS system 30, but may or may not include the AFS system 32, where the technique described below for determining if the vehicle driver is holding the steering wheel 12 will operate the same for either vehicle.

In general terms, the technique for determining if the driver is holding onto the steering wheel 12 includes measuring a resonant frequency of oscillation in the steering system 10, and comparing the resonant frequency to a known natural frequency of oscillation of the steering system 10 itself. The natural frequency is known based on physical parameters of the system 10, such as mass, inertia, stiffness and damping. If the observed resonant frequency is near the known natural frequency, it can be concluded that the driver's hands are not on the steering wheel 12. If, however, the observed resonant frequency is much lower than the known natural frequency, then it can be concluded that the driver's hand(s) are on the steering wheel 12, causing an increase in the effective moment of inertia of the steering wheel 12 and an accompanying decrease in the resonant frequency. The observed resonant frequency can be obtained from either the steering torque data, the steering angle data, or both.

The steering system 10 is approximated using a $2^{nd}$ order model, as follows:

$$(I_{str}+I_{drv})\ddot{\delta}+c_{str}\dot{\delta}+k_{str}\delta=\tau_{drv},\tau_{EPS}+\tau_{self-align}+\tau_{eng-vib} \qquad (1)$$

Where $\delta$ is steering angle (measured at the steering angle sensor 26), $I_{str}$ is the moment of inertia of the steering system 10 (known), $c_{str}$ is the damping coefficient of the steering system 10 (known), $k_{str}$ is the rotational stiffness of the steering system 10 (known), $\tau_{drv}$ is the driver-applied torque on the steering wheel 12 (measured at the torque sensor 28), $\tau_{EPS}$ is the steering torque from the EPS 30 (a known command), $\tau_{self-align}$ is the self-aligning torque in the steering system 10 (estimated), and $\tau_{eng-vib}$ is an engine vibration disturbance applied to the system 10 (affecting everything in the engine compartment, and including a wide range of frequencies). $I_{drv}$ is the moment of inertia added by the driver's hands on the steering wheel 12, which is unknown. It has been observed that $I_{drv}$ can vary from a relatively large value when the driver has both hands firmly gripping the steering wheel 12, to a smaller value when only one hand is lightly gripping the steering wheel 12, to a virtually undetectable value when the driver just has a finger lightly touching the steering wheel 12.

Other than the engine vibration disturbance, $I_{drv}$ is the only unknown in Equation (1). Other hands-on-the-wheel detection systems attempt to directly estimate $I_{drv}$, but this approach is sensitive to noise in the steering angle, and ignores the engine vibration disturbance. Rather than trying to directly estimate $I_{drv}$, the technique presented here measures the frequency response of the steering system 10, and uses this information to determine whether a significant amount of additional inertia ($I_{drv}$) has been added to the system 10.

From first principles of second order dynamic mechanical systems, the undamped natural frequency of the system 10 described in Equation (1) is:

$$\omega_n = \sqrt{\frac{k_{str}}{(I_{str}+I_{drv})}} \qquad (2)$$

Where $\omega_n$ is the undamped natural frequency of the steering system 10, and the other variables were defined above.

Similarly, the damped natural frequency, or resonant frequency, of the system 10 can be defined as:

$$\omega_r = \omega_n \sqrt{1-2\cdot\zeta^2} \qquad (3)$$

Where $\omega_r$ is the resonant frequency of the steering system 10, $\omega_n$ was defined in Equation (2), and $\zeta$ is the damping factor of the system 10, which in turn is defined as:

$$\zeta = \frac{c_{str}}{2\sqrt{(I_{str} + I_{drv}) \cdot k_{str}}} \quad (4)$$

As mentioned above, the inherent inertia, stiffness and damping characteristics of the steering system 10 are known by the vehicle manufacturer. For example, in a common passenger car or light sport-utility vehicle (SUV), the steering system stiffness, $k_{str}$, is around 2.0 N-m/deg, where most of the compliance is contributed by the intermediate shaft 18. In the same vehicles, the steering system inertia, $I_{str}$, is around 0.05 kg-m$^2$, where most of the inertia is contributed by the steering wheel 12. Steering system damping is targeted at a value of $c_{str}$ which provides critical damping—that is, where $\zeta = 0.5$.

Using the stiffness, inertia and damping values listed above, the resonant frequency of the steering system 10 with no inertia added by the driver's hands (that is, $I_{drv}=0$) is calculated to be around 14 Hz. Other types of vehicles may have a higher or lower steering system resonant frequency. Knowing this fundamental property of the steering system 10, an algorithm can be designed to detect the actual resonant frequency of vibration of the steering system 10, and compare the actual resonant frequency to the hands-off resonant frequency. If the actual resonant frequency is significantly lower than hands-off resonant frequency—around 3.5 Hz, for example—this is an indication that inertia has been added to the steering wheel 12 by the driver's hands, meaning that one or both hands are on the steering wheel 12.

Both the hands-off resonant frequency and the hands-on resonant frequency, for a particular vehicle type, can be experimentally measured on a test vehicle, and the respective frequencies can then be used in the method discussed below. Alternatively, the hands-off resonant frequency and the hands-on resonant frequency can be estimated, for a particular vehicle type, using Equations (2)-(4) and the known stiffness, mass and damping properties of the steering system 10.

The technique described above provides several advantages over existing systems for detecting a driver's hands on the steering wheel. These advantages include the ability to detect a driver's hands on/off the wheel both during manual driving and during LCC/LKA active driving, the ability to detect a driver steering override intention while LCC/LKA are active, the ability to immediately detect a hands-on situation, quicker detection of hands-off than the prior art, and the need for no additional hardware on the vehicle.

Figure 2:
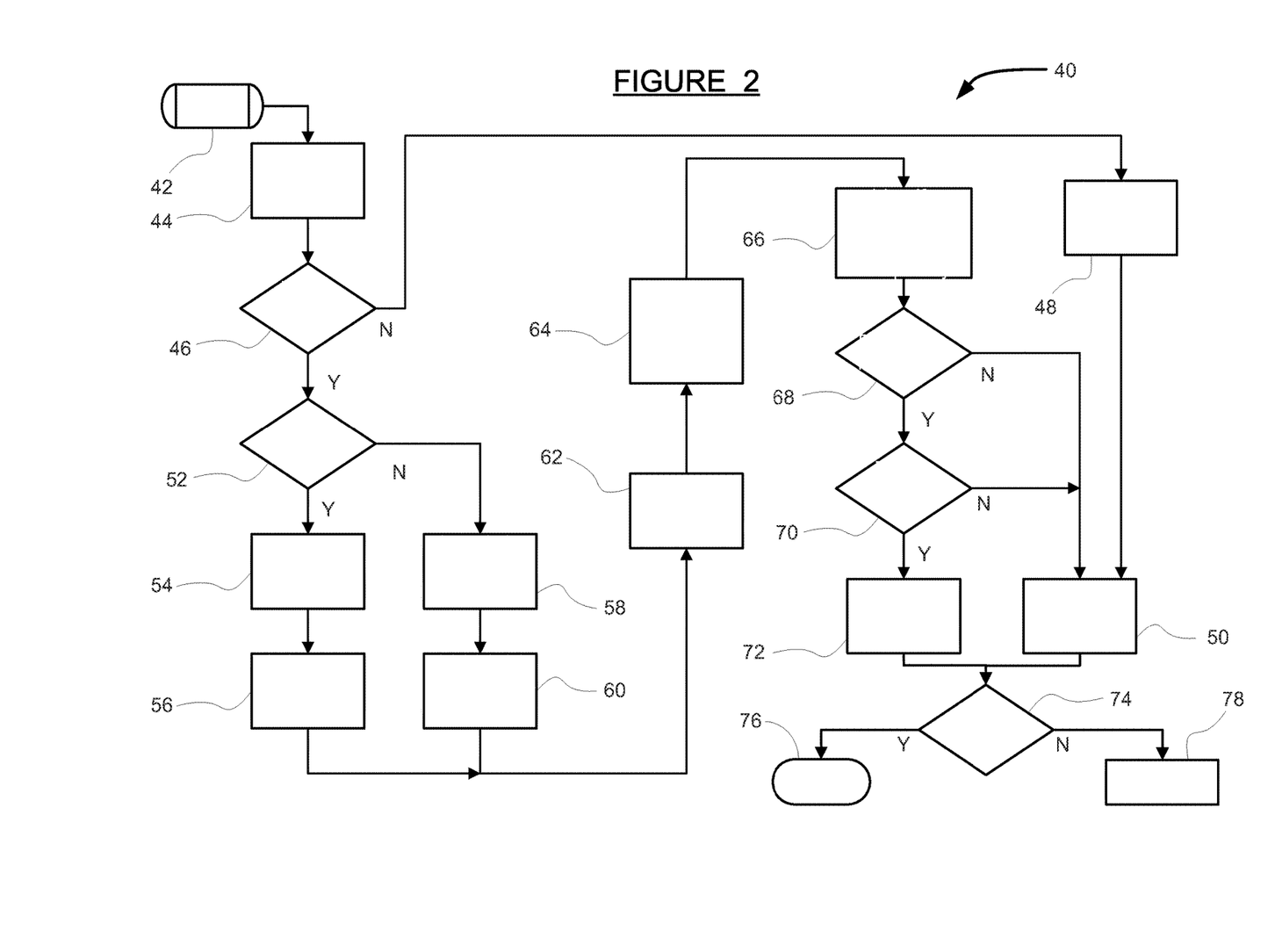
FIG. 2 is a flowchart diagram of a passive method for determining whether the driver is holding the vehicle steering wheel by comparing a measured resonant frequency to a known natural frequency in both steering angle and torque data.

FIG. 2 is a flowchart diagram 40 of a passive method for detecting whether the vehicle driver is holding onto the steering wheel 12 in the manner discussed above. In a preferred embodiment, the method of the flowchart diagram 40 is programmed in an algorithm which runs on the controller 34. The controller 34 is a device including at least a microprocessor and a memory module, where the microprocessor is configured to run the hands-on/off detection algorithm, and the memory is used to store sensor readings and other data, as would be understood by one skilled in the art.

The method begins at start oval 42. At box 44, steering angle and steering torque data are provided from the steering angle sensor 26 and the steering torque sensor 28, respectively. At decision diamond 46, it is determined whether the steering torque is less than a predefined torque threshold, where a torque value above the torque threshold indicates a clear driver steering effort. If the steering torque is not less than the torque threshold, then at box 48 a steering override status is set equal to Yes, and at box 50 the hands-on/off status is set to Hands On. The steering override status from the box 48 is used by LCC/LKA systems, which modify their behavior when the driver is clearly steering the vehicle himself/herself and/or trying to override the LCC/LKA system.

If the steering torque is less than the torque threshold at the decision diamond 46, then at decision diamond 52 it is determined whether an LCC or LKA system is on. If an LCC or LKA system is on, then at box 54 a band-pass filter at a first frequency value is applied to the steering angle data and the steering torque data, and at box 56 a frequency limit is set equal to the first frequency value. If an LCC or LKA system is not on, or not available, then at box 58 a band-pass filter at a second frequency value is applied to the steering angle data and the steering torque data, and at box 60 the frequency limit is set equal to the second frequency value. The purpose of the branching to either boxes 54/56 or boxes 58/60 is to optimize the performance of the algorithm based on the expected data. Specifically, if an LCC system is on, it is more likely that the driver's hands are off the steering wheel 12, and the observed resonant frequency will be that of the steering system 10 itself. In this case, the band-pass filter and the frequency limit can be set to a first frequency value around 14 Hz. This value will not be exactly 14 Hz for all vehicles, and can range at least from 13-15 Hz. On the other hand, if an LCC or LKA system is not on, it is much more likely that the driver's hands are on the steering wheel 12, and the observed resonant frequency will be affected by the driver's hands. In this case, the band-pass filter and the frequency limit can be set to a second frequency value around 3.5 Hz (+/−1), which is the expected response in a hands-on situation.

At box 62, a time window for steering angle data and steering torque data is defined. The time window could be, for example, about 2.5 seconds. Longer or shorter time windows could also be used. The intention of the time window is to analyze a data sample which is long enough to provide good resonant frequency analysis, but not so long as to be affected by earlier driver actions which are no longer applicable. At box 64, sensor data from the steering angle sensor 26 and the steering torque sensor 28 are selected for the time window. At box 66, a predominant resonant frequency is identified by analyzing either the steering angle data or the steering torque data, or both, within the time window. The resonant frequency being experienced by the steering system 10 will appear in both the steering angle data and the steering torque data, and thus, either or both can be analyzed.

Any applicable method of identifying a resonant frequency in time-history data may be used at the box 66. For example, a Fast Fourier Transform (FFT), such as a 256-point FFT, may be used. Alternatively, the number of peaks in the data in the time window can be counted, and the number of peaks can be used to determine the resonant frequency. Other methods may also be used. Regardless of what frequency identification method is used, the actual resonant frequency is identified at the box 66.

At decision diamond 68, it is determined whether the actual resonant frequency from the box 66 is greater than the frequency limit which was set at the box 56 or 60. If the actual resonant frequency is greater than the frequency limit, then a hands-off situation is possible, and at decision diamond 70 it is determined whether the actual resonant frequency has been greater than the frequency limit for a time period greater than or equal to a predefined time threshold. The time threshold, such as 5 seconds, is defined to ensure that enough data is analyzed to provide high confidence in a hands-off determination. If the actual resonant frequency has been greater than the frequency limit for a time period greater than or equal to the predefined time threshold, then at box 72 the hands-on/off status is set to Hands Off. The Hands Off status at the box 72 is a preliminary status, as determined by the passive detection method.

If actual resonant frequency is not greater than the frequency limit at the decision diamond 68, or if the actual resonant frequency has been greater than the frequency limit only for a time period less than the predefined time threshold at the decision diamond 70, then at the box 50 the hands-on/off status is set to Hands On. The Hands On status at the box 50 is a preliminary status, as determined by the passive detection method.

After the preliminary hands-on/off status is set to either Hands On at the box 50 or Hands Off at the box 72, a confidence factor is evaluated at decision diamond 74. The confidence factor is an indicator of the level of confidence in the passive hands-on/off determination, and may be based on the strength of the resonant frequency signal, the difference between the resonant frequency and the assigned frequency limit, and/or other parameters. If the confidence factor exceeds a predetermined threshold, such as 80%, the process ends at terminus 76, and the preliminary hands-on/off status is used as the actual status. Of course, the process actually runs continuously during vehicle operation, so from the terminus 76, the process returns to the start oval 42. If the confidence factor does not exceed the threshold at the decision diamond 74, the process proceeds to an active hands-on/off determination method as discussed below.

The preceding discussion of FIG. 2 and the theoretical background were disclosed in U.S. Pat. No. 8,880,287, issued Nov. 4, 2014, titled "STEERING-WHEEL-HOLD DETECTION FOR LANE KEEPING ASSIST FEATURE", which is assigned to the assignee of the present application and is hereby incorporated by reference in its entirety.

As mentioned above, the passive hands-on/off detection method of FIG. 2 may not, in some circumstances, yield a hands-on/off status with a high confidence. In such circumstances, it is desirable to run an active hands-on/off detection process which uses the results of the passive detection method to prescribe a steering perturbation signal which is applied to the steering system 10.

Figure 3:
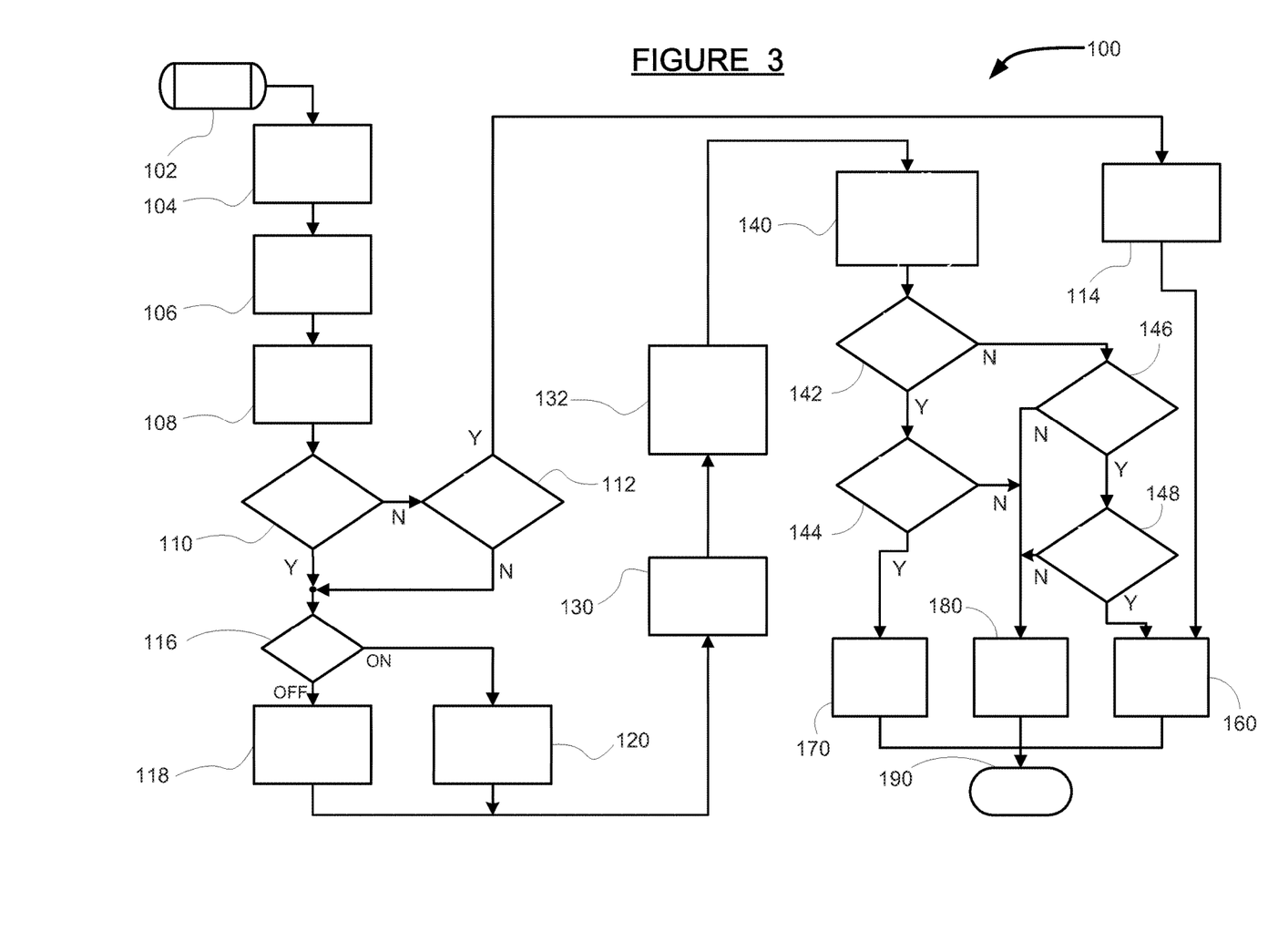
FIG. 3 is a flowchart diagram of an active method for determining whether the driver is holding the steering wheel, including applying a steering perturbation and measuring the frequency response of the steering system.

FIG. 3 is a flowchart diagram 100 of an active method for determining whether the driver is holding the steering wheel, including applying a steering perturbation and measuring the frequency response of the steering system. The active method of the FIG. 3 is employed when the passive determination method of FIG. 2 does not yield a sufficient level of confidence in the hands-on/off status. The active method of the FIG. 3 applies a vibration or oscillation in the steering system using the EPS system 30, where the applied vibration has a frequency, amplitude and duration which are established based on the results of the passive determination method.

The active hands-on/off determination method begins at start oval 102, where the preliminary hands-on or hands-off status from the passive determination method is provided from the box 78. At box 104, a frequency, an amplitude and a duration are established for a steering vibration which is to be "injected" or applied by the EPS system 30. The frequency is chosen as the known hands-off resonant frequency of the steering system (around 14 Hz) if the preliminary status from the passive detection method is equal to Hands Off. Likewise, the frequency is chosen as the known hands-on resonant frequency of the steering system (around 3.5 Hz) if the preliminary status from the passive detection method is equal to Hands On. The amplitude is chosen as a value which is large enough to be detectable in the measured system response, but small enough not to be objectionable to the driver. The duration is similarly chosen as a value which is large enough to allow detection in the measured system response, but small enough not to be objectionable to the driver. The frequency and amplitude of the injected steering vibration may also be adjusted based on vehicle speed and/or engine speed, as road disturbances and engine vibration are the main external exciters of steering system vibrations. Any speed-based adjustments to frequency and/or amplitude would be small—for example, less than 10%.

At box 106, the steering system perturbation or vibration is introduced by the EPS system 30 at the frequency, amplitude and duration established at the box 104. To be clear about what is being done here—the active detection method of FIG. 3 is being used to confirm a hand-on or hands-off status which is believed to be true based on the passive method. Thus, if the status is believed to be hands-on, a vibration at 3.5 Hz is applied to the steering system, and if a strong response at 3.5 Hz is detected, then the hands-on status is confirmed. Similarly, if the status is believed to be hands-off, a vibration at 14 Hz is applied to the steering system, and if a strong response at 14 Hz is detected, then the hands-off status is confirmed.

At box 108, steering angle and steering torque data are provided from the steering angle sensor 26 and the steering torque sensor 28, respectively. At decision diamond 110, it is determined whether the steering torque is less than a predefined torque threshold, where a torque value above the torque threshold indicates a clear driver steering effort. If the steering torque is not less than the torque threshold, then at decision diamond 112 it is determined whether the steering torque has been above the torque threshold for a sufficient time duration, such as one second. The time duration check is used to eliminate brief external steering torque application, such as hitting speed bumps or potholes at an oblique angle. If the time threshold is exceeded at the decision diamond 112, then at box 114 a steering override status is set equal to Yes, and at box 160 the final hands-on/off status is set to Hands On. The steering override status from the box 114 is used by LCC/LKA systems, which modify their behavior when the driver is clearly steering the vehicle himself/herself and/or trying to override the LCC/LKA system.

If the steering torque is less than the torque threshold at the decision diamond 110 or the time threshold is not exceeded at the decision diamond 112, then at decision diamond 116 the process branches based on the preliminary hands-on/off status. If the preliminary status is Hands Off, then at box 118 a bandpass filter at approximately 14 Hz is applied to the steering angle and torque data. Conversely, if the preliminary status is Hands On, then at box 120 a bandpass filter at approximately 3.5 Hz is applied to the steering angle and torque data. The bandpass filter applied at the box 118 or 120 is selected to match the vibration frequency which was injected at the box 106 and was in turn selected (based on preliminary hands-on/off status) at the box 102. The frequencies will not be exactly 14 Hz or 3.5 in all cases, but can vary by about +/−1 Hz based on vehicle and engine speed and based on vehicle-specific steering system characteristics.

At box 130, a time window for steering angle data and steering torque data is defined. The time window could be, for example, about 2.5 seconds. Longer or shorter time windows could also be used. The intention of the time window is to analyze a data sample which is long enough to provide good resonant frequency analysis, but not so long as to be affected by earlier driver actions which are no longer applicable. At box 132, sensor data from the steering angle sensor 26 and the steering torque sensor 28 are selected for the time window. At box 140, a predominant resonant frequency is identified by analyzing either the filtered steering angle data or steering torque data, or both, within the time window. The resonant frequency being experienced by the steering system 10, including the steering vibration injected by the EPS system 30 at the box 106, will appear in both the steering angle data and the steering torque data, and thus, either or both can be analyzed.

Any applicable method of identifying a resonant frequency in time-history data may be used at the box 140. For example, a Fast Fourier Transform (FFT), such as a 256-point FFT, may be used. Alternatively, the number of peaks in the data in the time window can be counted, and the number of peaks (with amplitude exceeding an amplitude threshold) can be used to determine the resonant frequency. Other methods may also be used. Regardless of what frequency identification method is used, the actual resonant frequency is identified at the box 140.

At decision diamond 142, it is determined whether the actual resonant frequency from the box 140 is within 1 Hz of the Hands Off frequency of ~14 Hz. That is, the absolute value of the difference between the actual resonant frequency and the Hands Off frequency must be less than 1 Hz. If so, then at decision diamond 144 it is determined whether the situation (actual response≈Hands Off) has been true for a time exceeding a time threshold, such as 3 seconds. If so, then at box 170 the final hands-on/off status is set equal to Hands Off. By confirming a frequency response of the steering system near 14 Hz, the active determination method of FIG. 3 yields a Hands Off determination at the box 170 with a very high confidence.

If, at the decision diamond 144, the time threshold has not been exceeded, then at box 180 the previous hands-on/off status is used, where the previous status may be the preliminary status from the passive detection method, or a previous confirmed/final status from the active method.

If, at the decision diamond 142, the actual resonant frequency from the box 140 is not within 1 Hz of the Hands Off frequency, then at decision diamond 146 it is determined whether the actual resonant frequency from the box 140 is within 1 Hz of the Hands On frequency of ~3.5 Hz. That is, the absolute value of the difference between the actual resonant frequency and the Hands On frequency must be less than 1 Hz. If so, then at decision diamond 148 it is determined whether the situation (actual response Hands On) has been true for a time exceeding a time threshold, such as 3 seconds. If so, then at the box 160 the final hands-on/off status is set equal to Hands On. By confirming a frequency response of the steering system near 3.5 Hz, the active determination method of FIG. 3 yields a Hands On determination at the box 160 with a very high confidence.

If, at the decision diamond 146, the actual resonant frequency from the box 140 is not within 1 Hz of the Hands On frequency, then at box 180 the previous hands-on/off status is used. Also, if at the decision diamond 148, the time threshold has not been exceeded, then at box 180 the previous hands-on/off status is used. After the final hands-on/off status is set to Hands On (at the box 160), Hands Off (at the box 170) or Use Previous (at the box 180), the process ends at terminus 190. As mentioned previously, the passive and active hands-on/off determination processes actually run and re-start continuously whenever the vehicle is in operation.

Figure 4:
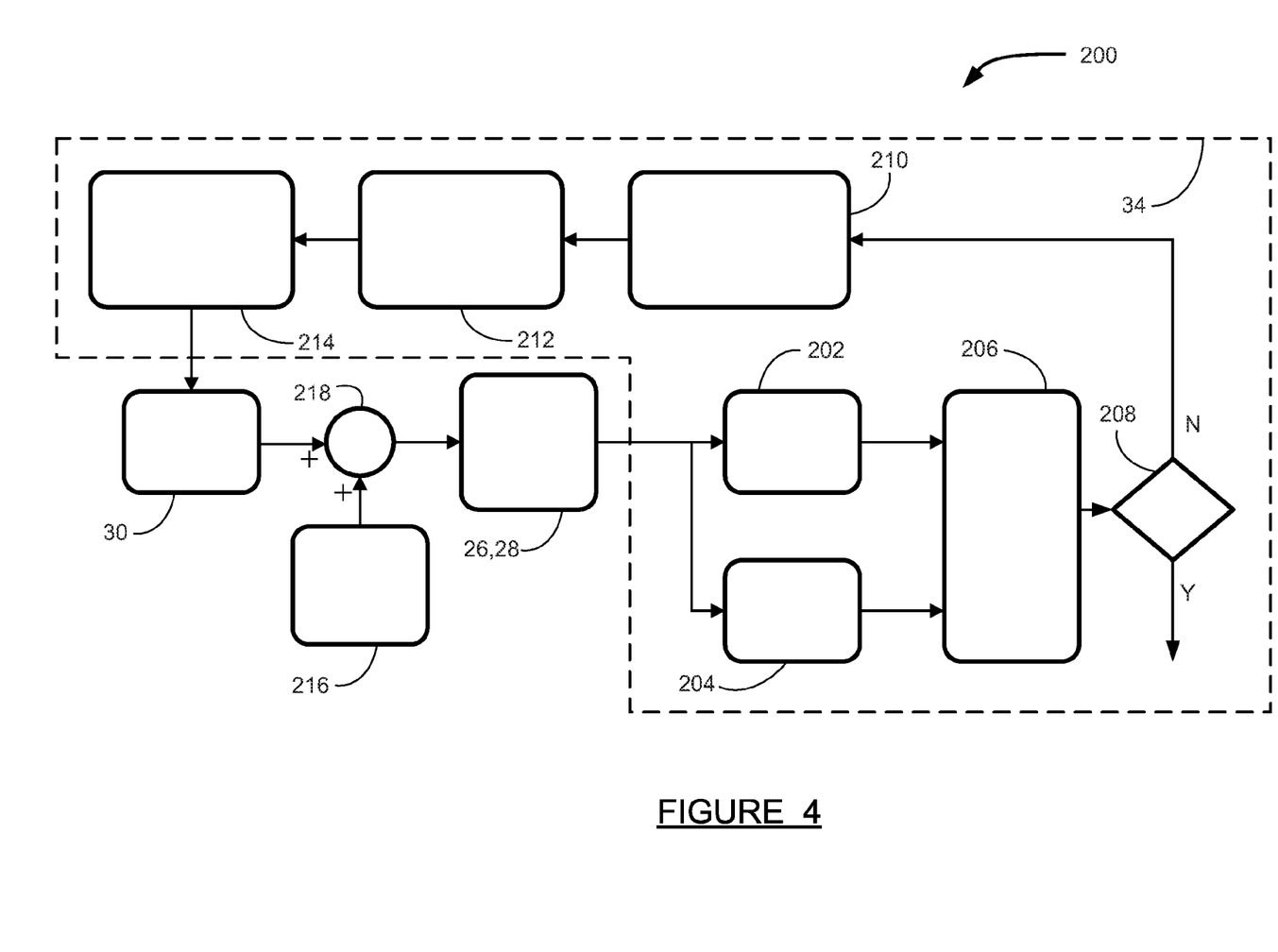
FIG. 4 is a block diagram of a steering wheel hold detection system which embodies both the passive detection method of FIG. 2 and the active detection method of FIG. 3.

FIG. 4 is a block diagram of a steering wheel hold detection system 200 which performs both the passive detection method of FIG. 2 and the active detection method of FIG. 3. All of the modules in the system 200 which are within the dashed-outline block are programmed on a controller such as the controller 34 of FIG. 1. As discussed previously, the controller 34 is in communication with the steering angle sensor 26, the torque sensor 28, and the EPS system 30.

At blocks 202 and 204, band pass filters are used to process the steering angle and torque data from the sensors 26 and 28 to determine whether a hands-on response (around 3.5 Hz) or a hands-off response (around 14 Hz) is present in the data. Initially, the blocks 202 and 204 are performing the passive hands-on/off detection of FIG. 2 discussed previously. That is, no active steering perturbation is being added by the EPS motor 30. The responses from the band pass filter blocks 202 and 204 are provided to a consistency check block 206, where it is determined whether the hands-on/off response has remained consistent for a period of time, such as three seconds. The results of the consistency check from the block 206 are provided to a decision diamond 208.

If, at the decision diamond 208, confidence is high in the hands-on/off determination, then the Hands On or Hands Off value is used by an LCC or LKA system in the vehicle. High confidence means that a predominant resonant frequency has been detected in the steering angle/torque data which is within a predetermined frequency range (such as 1.0 Hz) of either the Hands On frequency value (3.5 Hz) or the Hands Off frequency value (14 Hz), and the predominant resonant frequency has remained within the predetermined frequency range for a predetermined time period (such as three seconds). For example, if a predominant resonant frequency in a range of 3.1-3.7 Hz is detected in the band pass filter block 204 for several consecutive seconds, then confidence is high that the driver has his/her hands on the steering wheel.

If, after the passive hands-on/off evaluation, confidence is not high in the hands-on/off determination at the decision diamond 208, then the system 200 invokes the active hands-on/off determination process as discussed above in FIG. 3. At block 210, a frequency, amplitude and duration of a steering perturbation signal are adjusted based on the results of the passive evaluation. For example, if the passive evaluation detected a predominant resonant frequency in the steering system around 13.5-14.5 Hz, but the results were not consistent for several seconds and therefore confidence was not high, then a perturbation or vibration injection at around 14 Hz would be used in the active evaluation. Similarly, if the passive evaluation indicated mainly low frequency (Hands On) resonance, then a vibration injection of around 3.5 Hz would be used in the active evaluation. Amplitude can be established dependent on the frequency and other parameters. The duration of the steering perturbation signal—which may be fixed or may be adjusted for certain conditions—is also established at the block 210.

At block 212, the frequency and amplitude of the steering perturbation signal may be adjusted based on vehicle and engine speed, as discussed previously. Any adjustment at the block 212 would be small—for example, less than 10%. At block 214, the steering system vibration command is provided by the controller 34 to the EPS system 30. As discussed above, the steering system vibration injection is only used when the system 200 is operating in active detection mode, and is not used when the system 200 is operating in passive detection mode. As also discussed previously, based on the frequency/amplitude/duration of the vibration injection command, the motor of the EPS system 30 provides an oscillating torque on the rack 22, which results in the steering perturbation needed for the active hands-on/off determination method. At block 216, road disturbances and engine vibration are transmitted to the steering system 10. These unavoidable excitations combine, at junction 218, with the steering vibration injection by the EPS system 30 to cause a dynamic response of the steering system 10.

The steering angle sensor 26 and the torque sensor 28 provide measurement signals to the band pass filter blocks 202 and 204, as discussed previously. If the active hands on/off evaluation is being performed using a steering vibration injection, then a predominant resonance should be detectable at either the Hands On frequency (3.5 Hz) or the Hands Off frequency (14 Hz). As discussed above for the passive evaluation method, the time duration consistency check and confidence evaluation are performed, and a final hands on/off determination is made if possible. In the event that the results are inconclusive (confidence is not high) even after using active evaluation, then the previous Hands Off or Hands On value is used, and the system 200 continues to operate until a new high confidence value is determined.

The knowledge of hands-on or hands-off the steering wheel status is important in the implementation of lane centering or lane keeping systems, and is equally important in unassisted, manual driving. The methods and systems discussed above provide reliable detection of driver hands-on or hands-off status in a vehicle, including immediate detection of hands-on and driver steering override intention, and rapid detection of a hands-off situation. The method and system are effective in both LCC/LKA-assisted and manual driving situations.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining whether a driver is holding onto a steering wheel of a steering system of a vehicle, the method comprising:
   providing steering torque data from a steering torque sensor on the vehicle;
   providing steering angle data from a steering angle sensor on the vehicle;
   performing, using a microprocessor, a passive hands-on/off detection process to determine a preliminary hands-on/off status, the passive hands-on/off detection process including:
      identifying a predominant resonant frequency in the steering angle data or the steering torque data; and
      comparing the predominant resonant frequency to a first specified hands-on frequency of the steering system and to a second specified hands-off frequency of the steering system;
   determining a confidence level in the preliminary hands-on/off status;
   setting a final hands-on/off status equal to the preliminary hands-on/off status responsive to the confidence level exceeding a confidence threshold; and
   performing, using the microprocessor responsive to the confidence level not exceeding the confidence threshold, an active hands-on/off detection process to determine a final hands-on/off status, the active hands-on/off detection process including:
      establishing a frequency, an amplitude, and a duration of a steering perturbation based on the preliminary hands-on/off status;
      applying the steering perturbation to the steering system of the vehicle by an electric power steering (EPS) motor;
      identifying the predominant resonant frequency in the steering angle data or the steering torque data for a time window of a predefined duration; and
      determining the final hands-on/off status based on whether the predominant resonant frequency remains within a predefined frequency range of the frequency of the steering perturbation for a predefined time period.

2. The method of claim 1, wherein the passive hands-on/off detection process further includes:
   applying a band-pass filter at the first specified hands-on frequency to the steering angle data and the steering torque data;
   applying a band-pass filter at the second specified hands-off frequency to the steering angle data and the steering torque data; and
   selecting the steering angle data and the steering torque data for the time window.

3. The method of claim 2, further comprising:
   comparing a steering torque value to a steering torque threshold; and
   responsive to the steering torque value being greater than or equal to the steering torque threshold, setting a steering override value equal to yes and determining that the vehicle driver is holding onto the steering wheel.

4. The method of claim 2, wherein the first specified hands-on frequency is equal to a known steering system resonant frequency with the driver not holding onto the steering wheel, and the second specified hands-off frequency is equal to a known steering system resonant frequency with the driver holding onto the steering wheel.

5. The method of claim 2, wherein determining the confidence level in the preliminary hands-on/off status includes setting the confidence level to exceed the confidence threshold responsive to the predominant resonant frequency remaining within a predefined frequency range of the first specified hands-on frequency or the second specified hands-off frequency for a predefined time period.

6. The method of claim 1, wherein the active hands-on/off detection process further includes:
   modifying the frequency and the amplitude of the steering perturbation based on a vehicle speed and an engine speed;
   applying a band-pass filter, at a frequency substantially equal to the frequency of the steering perturbation, to the steering angle data and the steering torque data;
   selecting the steering angle data and the steering torque data for the time window; and
   setting the final hands-on/off status equal to the preliminary hands-on/off status responsive to the predominant resonant frequency remaining within the predefined frequency range of the frequency of the steering perturbation for the predefined time period.

7. The method of claim 6, wherein the final hands-on/off status for a current iteration of the method is set equal to the final hands-on/off status for a previous iteration of the method responsive to the predominant resonant frequency not remaining within the predefined frequency range of the frequency of the steering perturbation for the predefined time period.

8. The method of claim 6, further comprising:
comparing a steering torque value to a steering torque threshold; and
responsive to the steering torque value being greater than or equal to the steering torque threshold for a time exceeding a second time threshold, setting a steering override value equal to yes and determining that the vehicle driver is holding onto the steering wheel.

9. The method of claim 6, wherein identifying the predominant resonant frequency in the steering angle data or the steering torque data for the time window includes using a Fast Fourier Transform (FFT) technique.

10. The method of claim 6, wherein identifying the predominant resonant frequency in the steering angle data or the steering torque data for the time window includes counting a number of peaks above an amplitude threshold in the steering angle data or the steering torque data in the time window and using the number of peaks to determine the resonant frequency.

11. The method of claim 1, wherein the final hands-on/off status is used by a Lane Centering Control (LCC) system or a Lane Keeping Assist (LKA) system on the vehicle.

12. A method for determining whether a driver is holding onto a steering wheel of a steering system of a vehicle, the method comprising:
receiving, via a steering system controller of the vehicle, steering torque data from a steering torque sensor on the vehicle;
receiving, via the steering system controller, steering angle data from a steering angle sensor on the vehicle;
comparing a steering torque value to a steering torque threshold;
responsive to the steering torque value being greater than or equal to the steering torque threshold for a time exceeding a time threshold, setting a steering override value equal to yes and determining that the vehicle driver is holding onto the steering wheel;
performing, via the steering system controller, a passive hands-on/off detection process to determine a preliminary hands-on/off status, the passive hands-on/off detection process including:
identifying a predominant resonant frequency of vibration in the steering angle data or the steering torque data; and
comparing the predominant resonant frequency to a known hands-on resonant frequency of the steering system of the vehicle and to a known hands-off resonant frequency of the steering system;
determining a confidence level in the preliminary hands-on/off status;
setting a final hands-on/off status equal to the preliminary hands-on/off status if the confidence level exceeds a confidence threshold; and
performing, via the steering system controller responsive to the confidence level not exceeding the confidence threshold, an active hands-on/off detection process to determine a final hands-on/off status, the active hands-on/off detection process including:
establishing a frequency and an amplitude of a steering perturbation based on the preliminary hands-on/off status;
applying the steering perturbation to the steering system by an electric power steering (EPS) motor;
identifying the predominant resonant frequency in the steering angle data or the steering torque data for a time window of a predefined duration; and
determining the final hands-on/off status based on whether the predominant resonant frequency is within a predefined frequency range of the frequency of the steering perturbation.

13. The method of claim 12, wherein identifying the predominant resonant frequency includes using a Fast Fourier Transform (FFT) technique or counting a number of peaks in the steering angle data or the steering torque data and using the number of peaks to determine the predominant resonant frequency.

14. The method of claim 12, wherein identifying the predominant resonant frequency includes identifying the predominant resonant frequency in both the steering angle data and the steering torque data for the time window.

15. A system for determining whether a driver is holding onto a steering wheel of a steering system of a vehicle, the system comprising:
a steering angle sensor configured to provide steering angle data for the steering system of the vehicle;
a steering torque sensor configured to provide steering torque data for the steering system;
an Electric Power Steering (EPS) motor configured to couple to the steering system; and
a controller comprising a processor and a memory module and in communication with the steering angle sensor, the steering torque sensor, and the EPS motor, the controller being configured to determine whether the driver is holding onto the steering wheel by:
executing a passive hands-on/off detection algorithm resulting in a preliminary hands-on/off status, the passive hands-on/off detection process including:
identifying a predominant resonant frequency in the steering angle data or the steering torque data; and
comparing the predominant resonant frequency to a first specified hands-on frequency of the steering system and to a second specified hands-off frequency of the steering system;
determining a confidence level in the preliminary hands-on/off status;
setting a final hands-on/off status equal to the preliminary hands-on/off status responsive to the confidence level exceeding a confidence threshold; and
executing an active hands-on/off detection algorithm responsive to the confidence level not exceeding the confidence threshold, where the active hands-on/off detection algorithm determines a final hands-on/off status, the active hands-on/off detection algorithm including:
establishing a frequency and an amplitude of a steering perturbation based on the preliminary hands-on/off status;
applying the steering perturbation to the steering system by the EPS motor;
identifying the predominant resonant frequency in the steering angle data or the steering torque data for a time window of a predefined duration; and
determining the final hands-on/off status based on whether the predominant resonant frequency remains within a predefined frequency range of the frequency of the steering perturbation for a predefined time period.

16. The system of claim 15, wherein the controller is further configured to:
compare a steering torque value to a steering torque threshold; and
responsive to the steering torque value being greater than or equal to the steering torque threshold for a time exceeding a time threshold, set a steering override value equal to yes and determine that the driver is holding onto the steering wheel.

17. The system of claim 15, wherein the passive hands-on/off detection algorithm further includes:
applying a band-pass filter at the first specified hands-on frequency to the steering angle data and the steering torque data;
applying a band-pass filter at the second specified hands-off frequency to the steering angle data and the steering torque data; and
selecting the steering angle data and the steering torque data for the time window.

18. The system of claim 15, wherein the active hands-on/off detection algorithm includes:
establishing a duration of the steering perturbation based on the preliminary hands-on/off status;
modifying the frequency and the amplitude of the steering perturbation based on a vehicle speed and an engine speed;
applying a band-pass filter, at a frequency substantially equal to the frequency of the steering perturbation, to the steering angle data and the steering torque data;
selecting the steering angle data and the steering torque data for the time window; and
setting the final hands-on/off status equal to the preliminary hands-on/off status responsive to the predominant resonant frequency remaining within the predefined frequency range of the frequency of the steering perturbation for the predefined time period.

19. The system of claim 18, wherein identifying the predominant resonant frequency in the steering angle data or the steering torque data for the time window includes using a Fast Fourier Transform (FFT) technique or counting a number of peaks in the steering angle data or the steering torque data and using the number of peaks to determine the predominant resonant frequency.

20. The system of claim 15, wherein the final hands-on/off status is used by a Lane Centering Control (LCC) system or a Lane Keeping Assist (LKA) system on the vehicle.

* * * * *